United States Patent
Gisquet et al.

(10) Patent No.: US 10,313,668 B2
(45) Date of Patent: Jun. 4, 2019

(54) METHOD AND DEVICE FOR ENCODING OR DECODING AN IMAGE COMPRISING ENCODING OF DECODING INFORMATION REPRESENTING PREDICTION MODES

(71) Applicant: CANON KABUSHIKI KAISHA, Tokyo (JP)

(72) Inventors: Christophe Gisquet, Rennes (FR); Guillaume Laroche, Melesse (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 507 days.

(21) Appl. No.: 15/008,277

(22) Filed: Jan. 27, 2016

(65) Prior Publication Data

US 2016/0227211 A1 Aug. 4, 2016

(30) Foreign Application Priority Data

Jan. 29, 2015 (GB) .................................. 1501516.7

(51) Int. Cl.
*H04N 19/11* (2014.01)
*H04N 19/176* (2014.01)
*H04N 19/196* (2014.01)
*H04N 19/593* (2014.01)

(52) U.S. Cl.
CPC ........... *H04N 19/11* (2014.11); *H04N 19/176* (2014.11); *H04N 19/197* (2014.11); *H04N 19/593* (2014.11)

(58) Field of Classification Search
None
See application file for complete search history.

(56) References Cited

U.S. PATENT DOCUMENTS

| 2012/0307894 | A1* | 12/2012 | Chien | H04N 19/176 |
| | | | | 375/240.12 |
| 2014/0219342 | A1* | 8/2014 | Yu | H04N 19/50 |
| | | | | 375/240.12 |
| 2015/0373334 | A1* | 12/2015 | Rapaka | H04N 19/139 |
| | | | | 375/240.02 |

FOREIGN PATENT DOCUMENTS

WO 2012/167119 A1 12/2012

* cited by examiner

*Primary Examiner* — James M Anderson, II
(74) *Attorney, Agent, or Firm* — Canon U.S.A., Inc. I.P. Division

(57) ABSTRACT

The present invention concerns a method for encoding an image, comprising the encoding of mode information representing a prediction mode for encoding a current block of pixels according to an Intra coding mode, the method comprising for the determination of set of most probable modes defining at least one candidate for a most probable mode to be the mode information of a neighbor-block if it exists; wherein a candidate for a most probable mode is the horizontal or vertical mode information if this neighbor-block exists and has been encoded using a predetermined coding mode.

11 Claims, 10 Drawing Sheets

- Prior Art -

- Prior Art -

- Prior Art -

- Prior Art -

METHOD AND DEVICE FOR ENCODING OR DECODING AN IMAGE COMPRISING ENCODING OF DECODING INFORMATION REPRESENTING PREDICTION MODES

This application claims the benefit under 35 U.S.C. § 119(a)-(d) of United Kingdom Patent Application No. 1501516.7 filed on Jan. 29, 2015 and entitled "Method and device for encoding or decoding an image comprising encoding of decoding information representing prediction modes." The above cited patent application is incorporated herein by reference in its entirety.

FIELD OF THE INVENTION

The invention relates to a method and a device for encoding or decoding an image comprising the encoding or decoding of mode information representative of a prediction mode. Particularly, but not exclusively the invention relates more specifically to intra mode coding in the High Efficiency Video Coding (HEVC) standard under development.

DESCRIPTION OF THE PRIOR-ART

Video applications are continuously moving towards higher resolution. A large quantity of video material is distributed in digital form over broadcast channels, digital networks and packaged media, with a continuous evolution towards higher quality and resolution (e.g. higher number of pixels per frame, higher frame rate, higher bit-depth or extended color gamut). This technology evolution puts higher pressure on the distribution networks that are already facing difficulties in bringing HDTV resolution and high data rates economically to the end user. Consequently, any further data rate increases will put additional pressure on the networks. To handle this challenge, ITU-T and ISO/MPEG decided to launch in January 2010 a new video coding standard project, named High Efficiency Video Coding (HEVC).

The HEVC codec design is similar to that of previous so-called block-based hybrid transform codecs such as H.263, H.264, MPEG-1, MPEG-2, MPEG-4, SVC. Video compression algorithms such as those standardized by standardization bodies ITU, ISO and SMPTE use the spatial and temporal redundancies of the images in order to generate data bit streams of reduced size compared with the video sequences. Such compression techniques render the transmission and/or storage of the video sequences more effective.

FIG. 1 shows an example of an image coding structure used in HEVC and its extensions, among which the Screen Content Coding extension (hereupon designed as SCC). It is also referenced in document JCTVC-S1005 (HEVC Screen Content Coding Draft Text 2), the latest as of writing. A video sequence is made up of a sequence of digital images 101 represented by one or more matrices the coefficients of which represent pixels.

An image 101 is made up of one or more slices 102. A slice may be part of the image or, in some cases, the entire image. Slices are divided into non-overlapping blocks, typically referred to as Coding Tree Blocks (CTBs) 103; CTBs are generally blocks of size 64 pixels×64 pixels. Each CTB may in turn be iteratively divided into smaller variable size Coding Units (CUs) 104 using a quadtree decomposition.

During video compression in HEVC and its extensions, each block of an image being processed is predicted spatially by an "Intra" predictor (so-called "Intra" coding mode), temporally by an "Inter" predictor (so-called "Inter" coding mode), or, in the SCC extension, by various coding methods dedicated to the coding of Screen Content, in particular the Intra Block Copy mode, which also uses a predictor a block, and the Palette mode, which does not. Each predictor is a block of pixels issued from the same image. In Intra coding mode the predictor (Intra predictor) used for the current block being coded is a block of pixels constructed from information already encoded of the current image. In Intra Block Copy, the predictor is a block of decoded pixels in the causal area of the same image. By virtue of the identification of the predictor block and the coding of the residual, it is possible to reduce the quantity of information actually to be encoded.

A CU is thus coded according to an intra coding mode, (samples of the CU are spatially predicted from neighboring samples of the CU) or to an inter coding mode (samples of the CU are temporally predicted from samples of previously coded slices), or as Intra Block Copy or Palette.

Once the CU samples have been predicted, the residual signal between the original CU samples and the prediction CU samples is generated. This residual is then coded after having applied transform and quantization processes.

In the current HEVC design, as well as in previous designs such as MPEG-4 AVC/H.264, intra coding involves deriving an intra prediction block from reconstructed neighboring samples 201 of the block to be encoded (decoded), as illustrated schematically in FIG. 2A. Referring to FIG. 2B, when coding a current CU 202, Intra mode coding makes use of two neighboring CUs that have already been coded, namely the Top and Left CUs 203 and 204.

In intra mode coding multiple prediction modes are supported, including directional or non-directional intra prediction modes. When a CU is intra coded, its related intra prediction mode is coded in order to inform a decoder how to decode the coded CU.

FIG. 3 illustrates intra prediction modes 'intraPredMode' supported in the current HEVC design, along with their related mode values used to identify the corresponding intra prediction mode. The number of supported modes depends on the size of a coding unit (CU).

The intra prediction modes include prediction modes which are not directional including a planar prediction mode and a DC mode.

The other modes are directional, which means that the samples are predicted according to a given angular direction.

It can be noticed in FIG. 3 that the intra prediction modes are numbered in a specific order, starting with Planar (index 0) and DC (index 1), then from the bottom left direction to the top right direction, in clockwise fashion. Some particular values can be observed, such as the Horizontal direction (index 10) and the Vertical direction (index 26). In the following, these two directions are designated by respectively HOR and VER, as the actual values are irrelevant to the invention. The intraPredMode (301) represents the different possible intra prediction modes defined in HEVC and its extensions, and correspond to the values that are actually coded/decoded.

FIG. 4 is a flowchart illustrating steps of a known method of Intra mode coding performed in the current HEVC design and its extensions. It consists in deriving a list of 3 Most Probable Modes (hereafter MPM), sometime also called reference prediction mode. Steps 401 to 404 are symmetrical to steps 405 to 408, so the description for them is combined in the following. The neighboring Top and Left CUs 203 and 204 of current CU 202, as illustrated in FIG. 2B, are identified and tested to be present (e.g. if on a border of the image or tile or slice) on respectively steps 401 and 405. If they do, processing continues to respectively steps 404 and 408, where the candidate directions candT and candL are set to the DC mode. Otherwise, on respectively steps 402 and 406, the Top or Left CUs are verified to be Intra. If it is not the case, e.g. if the corresponding CU is coded as Inter, Intra Block Copy or Palette, then the process continues with respectively the aforementioned steps 404 and 408. If indeed the Top or Left CUs are Intra coded, then respectively candT and candL are set to their respective Intra prediction modes modeT and modeL on respectively steps 403 and 407. Please note that a provision, known to the man skilled in the art, is made in HEVC on step 403 so that the mode of a CU belonging to another CTB line that the current one, is forced to be DC. Now that candT and candL are determined, the actual derivation of the MPMs can be performed.

Using MPMs makes the coding process more efficient. The mode of the CU is often equal to one of the MPMs. As fewer bits are used to signal that the mode is equal to one of the MPMs than to signal it as one of the remaining modes, the overall coding cost is reduced.

The remainder of the MPM derivation starts with step 409, where candT and candL are compared: if they are equal, process continues with step 410, otherwise with step 413, where the first two MPMs, MPM0 and MPM1, are respectively set to candL and candT. Then, step 414 checks whether MPM0 or MPM1 are the planar mode. If they are not, then MPM2 is simply set to the planar mode on step 415, otherwise step 416 checks whether MPM0 and MPM1 are not the DC mode. If they are not, MPM2 is set to DC, otherwise it is set to VER.

Otherwise, as there is only one candidate Intra prediction mode (candL being equal to candT), specific rules must be applied. Therefore, said candidate is tested to be an angular prediction mode (i.e., neither Planar nor DC). If it is, step 412 derives MPM1 and MPM2 as two angular prediction modes different from candL through the formulae, where % is the modulo operation, MPM1=((MPM0−2−1)%32)+2 and MPM2=((MPM0−2+1)%32)+2, which effectively selects as MPMs the directions surrounding MPM0 in FIG. 3. Otherwise (it is either Planar or DC), then MPM0 is set to the Planar mode, MPM1 is set to the DC mode, and MPM2 is set to the VER mode.

Therefore, the MPM derivation ends on either step 412, 415, 417 or 18, and the list of MPMs can be used for actual coding or decoding of the Intra prediction mode. Note that in the above, when referring to the FDIS version of HEVC (e.g. document JCTVC-L1003) and in particular its section 8.4.2, the present Planar, DC, VER, HOR, candL, candU, MPM0, MPM1, MPM2 are respectively INTRA_PLANAR, INTRA_DC, INTRA_ANGULAR10, INTRA_ANGULAR26, candIntraPredModeA, candIntraPredModeB, candModeList[0], candModeList[1], candModeList[2]. Other equivalences should be obvious to the man skilled in the art.

FIG. 5 schematically illustrates a known decoding tree of the intra mode. In this figure, italic bold font is used to indicate syntax elements that are decoded. Blocks correspond to operations performed during the decoding process.

Firstly the flag prev_intra_luma_pred_flag indicating whether or not the prediction mode is one of the MPMs (MPM0 505 and MPM1 506) is decoded in step 501 as a CABAC bit. If the prev_intra_luma_pred_flag is equal to 1, the MPM index mpm_idx is decoded in step 602 to identify if the mode is equal to any of the MPMs. It is a variable-length code using bypassed bins (i.e. non-CABAC coded), taking the values of '0' (MPM0), '10' (MPM1) or '11' (MPM2). Otherwise, if the flag prev_intra_luma_pred_flag is equal to 0, rem_intra_luma_pred_mode is decoded in step 503, as a codeword of fixed length 5. Please note that to ease the derivation of its value, the MPMs are sorted by value. The prediction mode is finally deduced from the remaining mode value and from the MPMs values in step 504.

To summarize, the decoding process works as follows:
If the prev_intra_luma_pred_flag '1' is decoded, the prediction mode is one of the MPMs
  If the mpm_idx codeword '0' is decoded, mode=MPM0
  Else if it is '10', mode=MPM1
  Else mode=MPM2
Else, rem_intra_luma_pred_mode is decoded using VLC codeword; the prediction mode is deduced for rem_intra_luma_pred_mode and the MPM values.

A drawback of the above described methods is that in the SCC extension, the neighbor CUs 203 and 204 are often coded as either Intra Copy Block or Palette, therefore leading to a "default" MPM list unsuited for coding of Screen Content, as the HOR and VER directions are more frequent, as seen in hard edges present in Graphical User Interfaces, flowcharts, graphics, etc. Furthermore, content encoded with those modes offer a better quality than more classical coding means, so it is advantageous to predict from their pixels.

SUMMARY OF THE INVENTION

The present invention has been devised to address one or more of the foregoing concerns.

According to a first aspect of the invention there is provided a method for encoding an image, comprising the encoding of mode information representing a prediction mode for encoding a current block of pixels according to an Intra coding mode, the method comprising for the determination of set of most probable modes defining at least one candidate for a most probable mode to be the mode information of a neighbor-block if it exists; wherein a candidate for a most probable mode is the horizontal or vertical mode information if this neighbor-block exists and has been encoded using a predetermined coding mode.

In an embodiment, the predetermined coding mode is neither inter coding mode nor intra coding mode.

In an embodiment, the predetermined coding mode is a screen content coding mode.

In an embodiment, the neighbor-block is located left to the current block and wherein the candidate for a most probable mode determined if this neighbor-block exists and has been encoded using a screen content coding mode is the horizontal mode information.

In an embodiment, the neighbor-block is located top of the current block and wherein the candidate for a most probable mode determined if this neighbor-block exists and has been encoded using a screen content coding mode is the vertical mode information.

In an embodiment, the method comprises for the determination of set of most probable modes:
determining the existence of a left-block being a block of pixels already encoded located at the left of the current block; and
defining a first candidate for a most probable mode to be the mode information of this left-block if it exists and has been encoded using an Intra coding mode; and
determining the existence of a top-block of pixels already encoded located at the top of the current block; and
defining a second candidate for a most probable mode to be the mode information of this top-block if it exists and has been encoded using an Intra coding mode;

wherein the method further comprises:

defining a first candidate for a most probable mode to be the horizontal mode information if this left-block exists and has been encoded using a content coding mode; and defining a second candidate for a most probable mode to be the vertical mode information if this top-block exists and has been encoded using a content coding mode.

In an embodiment, the screen content coding modes considered as screen content Intra coding modes are the Intra Block Copy coding mode and the Palette mode.

In an embodiment, the method further comprises:

defining a first candidate for a most probable mode to be the horizontal mode information if this left-block does not exist; and defining a second candidate for a most probable mode to be the vertical mode information if this top-block does not exist.

In an embodiment, the planar information mode is replaced by the horizontal information mode in the derivation of further candidates information mode if a neighbor-block exists and has been encoded using a screen content coding mode.

In an embodiment, the DC information mode is replaced by the vertical information mode in the derivation of further candidates information mode if a neighbor-block exists and has been encoded using a screen content coding mode.

According to another aspect of the invention there is provided a device for encoding an image, comprising the encoding of mode information representing a prediction mode for encoding a current block of pixels according to an Intra coding mode, the device being configured to a method comprising the step of defining at least one candidate for a most probable mode to be the mode information of a neighbour-block if it exists; wherein a candidate for a most probable mode is the horizontal or vertical mode information if this neighbour-block exists and has been encoded using a predetermined coding mode.

According to another aspect of the invention there is provided a non-transitory computer-readable storage medium storing instructions of a computer program for implementing a method according to the invention.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF EMBODIMENTS OF THE INVENTION

While the description of the prior art has been provided for means of illustration, the core concept, to which the present invention is associated, is the derivation of the MPM list. This concept, independently of its name and its implementation, can be easily transposed by the man skilled in the art, e.g. when the MPM derivation processes for different channels may differ, or the number of MPMs differ, etc.

Figure 6:
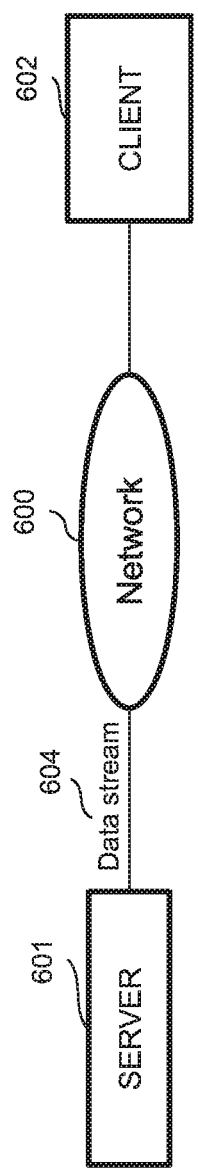
FIG. 6 is a schematic block diagram illustrating a data communication system in which one or more embodiments of the invention may be implemented.

FIG. 6 illustrates a data communication system in which one or more embodiments of the invention may be implemented. The data communication system comprises a sending device, in this case a server 601, which is operable to transmit data packets of a data stream to a receiving device, in this case a client terminal 602, via a data communication network 600. The data communication network 600 may be a Wide Area Network (WAN) or a Local Area Network (LAN). Such a network may be for example a wireless network (Wifi/802.11a or b or g), an Ethernet network, an Internet network or a mixed network composed of several different networks. In a particular embodiment of the invention the data communication system may be, for example, a digital television broadcast system in which the server 601 sends the same data content to multiple clients.

The data stream 604 provided by the server 601 may be composed of multimedia data representing video and audio data. Audio and video data streams may, in some embodiments, be captured by the server 601 using a microphone and a camera respectively. In some embodiments data streams may be stored on the server 601 or received by the server 601 from another data provider. The video and audio streams are coded by an encoder of the server 601 in particular for them to be compressed for transmission.

In order to obtain a better ratio of the quality of transmitted data to quantity of transmitted data, the compression of the video data may be of motion compensation type, for example in accordance with the HEVC format, its extensions, or H.264/AVC format.

A decoder of the client 602 decodes the reconstructed data stream received by the network 600. The reconstructed images may be displayed display device and received audio data may be reproduced by a loud speaker.

Figure 7:
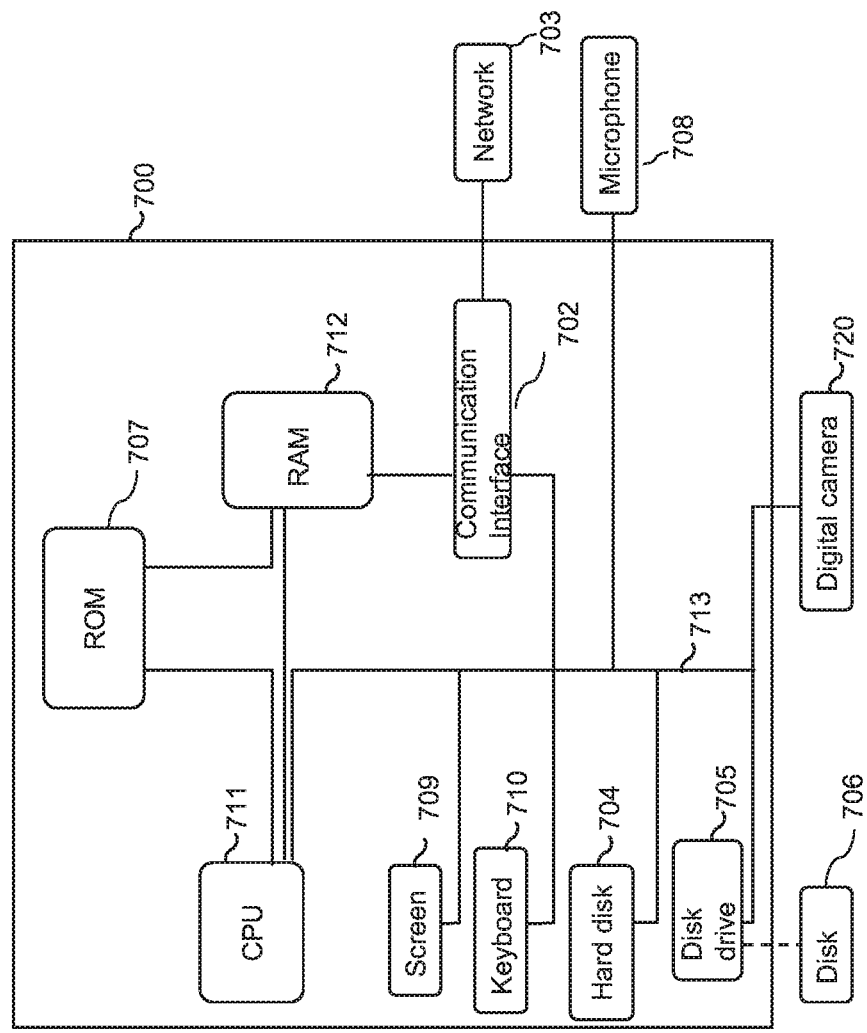
FIG. 7 is a schematic block diagram illustrating a processing device configured to implement at least one embodiment of the present invention.

FIG. 7 schematically illustrates a processing device 700 configured to implement at least one embodiment of the present invention. The processing device 700 may be a device such as a micro-computer, a workstation or a light portable device such as a smart phone and portable computer. The device 700 comprises a communication bus 713 connected to:

- A central processing unit 711, such as a microprocessor, denoted CPU;
- A read only memory 707, denoted ROM, for storing computer programs for implementing embodiments of the invention;
- A random access memory 712, denoted RAM, which may be used for storing the executable code of the method of embodiments of the invention as well as the registers adapted to record variables and parameters necessary for implementing the method of encoding a sequence of digital images and/or the method of decoding a bitstream according to embodiments of the invention; and
- A communication interface 702 connected to a communication network 703 over which data to be processed is transmitted or received.

Optionally, the apparatus 700 may also include the following components:

- A data storage means 704 such as a hard disk, for storing computer programs for implementing methods of one or more embodiments of the invention and data used or produced during the implementation of one or more embodiments of the invention;
- A disk drive 705 for a disk 706, the disk drive being adapted to read data from the disk 706 or to write data onto said disk;
- A screen 709 for displaying data and/or serving as a graphical interface with the user, by means of a keyboard 710 or any other pointing means.

The apparatus 700 can be connected to various peripherals, such as for example a digital camera 720 or a microphone 708, each being connected to an input/output card (not shown) so as to supply multimedia data to the apparatus 700.

The communication bus 713 provides communication and interoperability between the various elements included in the apparatus 700 or connected to it. The representation of the communication bus is not limiting and in particular the central processing unit is operable to communicate instructions to any element of the apparatus 700 directly or by means of another element of the apparatus 700.

The disk 706 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method of encoding a sequence of digital images and/or the method of decoding a bitstream according to the invention to be implemented.

The executable code may be stored either in read only memory 707, on the hard disk 704 or on a removable digital medium such as for example a disk 706 as described previously. Moreover in some embodiments, the executable code of the programs can be received by means of the communication network 703, via the interface 702, in order to be stored in one of the storage means of the apparatus 700 before being executed, such as the hard disk 704.

The central processing unit 711 is adapted to control and direct the execution of the instructions or portions of software code of the program or programs according to the invention, instructions that are stored in one of the aforementioned storage means. On powering up, the program or programs that are stored in a non-volatile memory, for example on the hard disk 704 or in the read only memory 707, are transferred into the random access memory 712, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Figure 8:
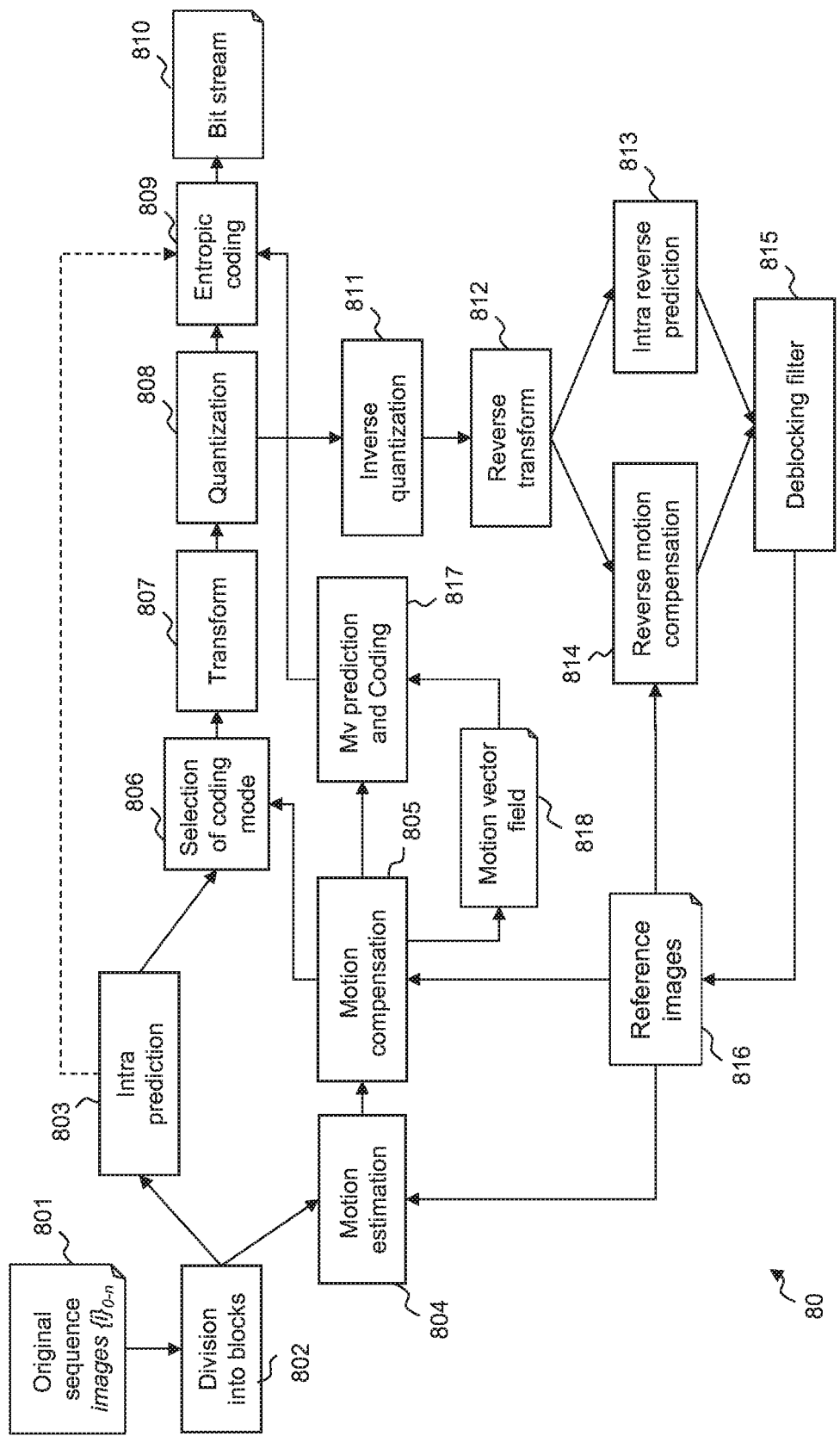
FIG. 8 is a schematic block diagram ram of an encoder according to at least one embodiment of the invention.

FIG. 8 illustrates a block diagram of an encoder according to at least one embodiment of the invention. The encoder is represented by connected modules, each module being adapted to implement, for example in the form of programming instructions to be executed by the CPU 711 of device 700, at least one corresponding step of a method implementing at least one embodiment of encoding an image of a sequence of images according to one or more embodiments of the invention.

An original sequence of digital images i0 to in 801 is received as an input by the encoder 80. Each digital image is represented by a set of samples, known as pixels. A bitstream 810 is output by the encoder 80 after implementation of the encoding process.

The bitstream 810 comprises a plurality of encoding units or slices, each slice comprising a slice header for transmitting encoding values of encoding parameters used to encode the slice, such as prediction mode information, and a slice body, comprising encoded video data.

The input digital images i0 to in 801 are divided into blocks of pixels by module 802. The blocks correspond to image portions and may be of variable sizes (e.g. 4×4, 8×8, 16×16, 32×32 pixels). A coding mode is selected for each input block or coding unit. Two families of coding modes are provided: coding modes based on spatial prediction coding (Intra prediction), and coding modes based on temporal prediction (Inter coding, Merge, SKIP). The possible coding modes are tested.

Module 803 implements Intra prediction, in which a given block to be encoded is predicted by a predictor computed from pixels of the neighborhood of said block to be encoded. An indication of the selected Intra predictor and the difference between the given block and its predictor is encoded to provide a residual if the Intra coding is selected.

Temporal prediction is implemented by motion estimation module 804 and motion compensation module 805. Firstly a reference image from among a set of reference images 816 is selected, and a portion of the reference image, also called reference area or image portion, which is the closest area to the given block to be encoded, is selected by the motion estimation module 804. Motion compensation module 806 then predicts the block to be encoded using the selected area. The difference between the selected reference area and the given block, also called a residual block, is computed by the motion compensation module 805. The selected reference area is indicated by a motion vector.

Thus in both cases (spatial and temporal prediction), a residual is computed by subtracting the prediction from the original block.

In the INTRA prediction implemented by module 803, a prediction direction is encoded. In the temporal prediction, at least one motion vector is encoded. Information relative to the motion vector and the residual block is encoded if the intra prediction is selected. The encoding of mode information representing a prediction mode will be explained in more detail hereafter with reference to FIG. 10.

To further reduce the bitrate, assuming that motion is homogeneous, the motion vector is encoded by difference with respect to a motion vector predictor. Motion vector predictors of a set of motion information predictors is obtained from the motion vectors field 818 by a motion vector prediction and coding module 817.

The encoder 80 further comprises a selection module 806 for selection of the coding mode by applying an encoding cost criterion, such as a rate-distortion criterion.

In order to further reduce redundancies a transform is applied by transform module 807 to the residual block, the transformed data obtained is then quantized by quantization module 808 and entropy encoded by entropy encoding module 809. Finally, the encoded residual block of the current block being encoded is inserted into the bitstream 810, along with the information relative to the predictor used such as the index of the selected motion vector predictor. For the blocks encoded in 'SKIP' mode, only an index to the predictor is encoded in the bitstream, without any residual block.

The encoder 80 also performs decoding of the encoded image in order to produce a reference image for the motion estimation of the subsequent images. This enables the encoder and the decoder receiving the bitstream to have the same reference frames. The inverse quantization module 811 performs inverse quantization of the quantized data, followed by an inverse transform by reverse transform module 812. The reverse intra prediction module 813 uses the prediction information to determine which predictor to use for a given block and the reverse motion compensation module 814 actually adds the residual obtained by module 812 to the reference area obtained from the set of reference images 816. Optionally, a deblocking filter 815 is applied to remove the blocking effects and enhance the visual quality of the decoded image. The same deblocking filter is applied at the decoder, so that, if there is no transmission loss, the encoder and the decoder apply the same processing.

Figure 9:
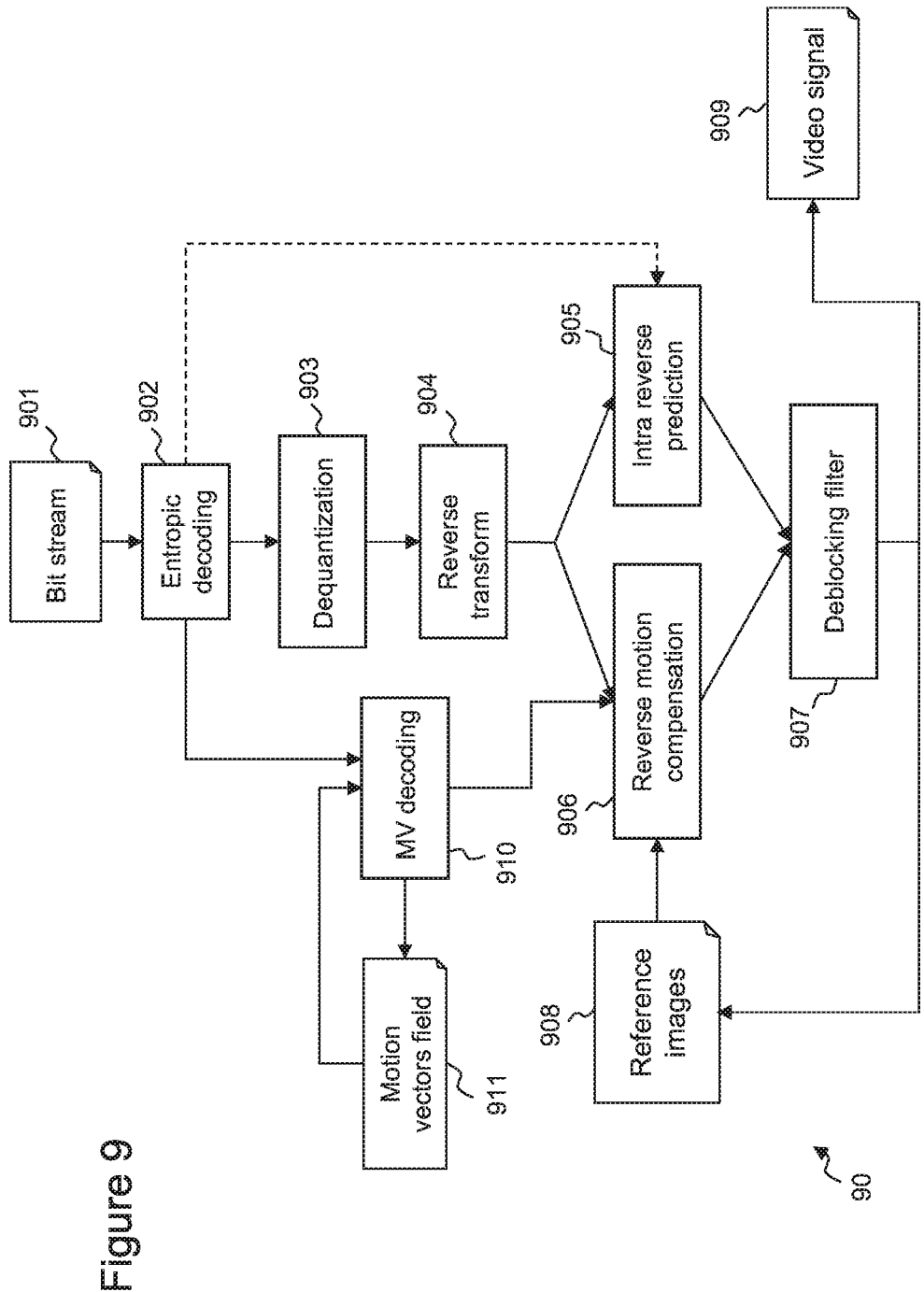
FIG. 9 is a schematic block diagram of a decoder according to at least one embodiment of the invention.

FIG. 9 illustrates a block diagram of a decoder according to at least one embodiment of the invention. The decoder is represented by connected modules, each module being adapted to implement, for example in the form of programming instructions to be executed by the CPU 311 of device 300, a corresponding step of a decoding method.

The decoder 90 receives a bitstream 901 comprising encoding units, each one being composed of a header containing information on encoding parameters and a body containing the encoded video data. As explained with respect to FIG. 80, the encoded video data is entropy encoded, and the motion vector predictors' indexes are encoded, for a given block, on a predefined number of bits. The received encoded video data is entropy decoded by module 902. The residual data are then dequantized by module 903 and then a reverse transform is applied by module 904 to obtain pixel values.

The mode data indicating the coding mode are also entropy decoded and based on the mode, an INTRA type decoding or an INTER type decoding is performed on the encoded blocks of image data.

In the case of INTRA mode, an INTRA predictor is determined by intra reverse prediction module 905 based on the intra prediction mode specified in the bitstream.

If the mode is INTER, the motion prediction information is extracted from the bitstream so as to find the reference area used by the encoder. The motion prediction information is composed of the reference frame index and the motion vector residual. The motion vector predictor is added to the motion vector residual in order to obtain the motion vector by motion vector decoding module 910.

Motion vector decoding module 910 applies motion vector decoding for each current block encoded by motion prediction. Once an index of the motion vector predictor, for the current block has been obtained the actual value of the motion vector associated with the current block can be decoded and used to apply reverse motion compensation by module 906. The reference image portion indicated by the decoded motion vector is extracted from a reference image 908 to apply the reverse motion compensation 906. The motion vector field data 911 is updated with the decoded motion vector in order to be used for the inverse prediction of subsequent decoded motion vectors.

Finally, a decoded block is obtained. A deblocking filter 907 is applied; similarly to the deblocking filter 816 applied at the encoder. A decoded video signal 909 is finally provided by the decoder 90.

In an embodiment of the invention the encoding of mode information representing a prediction mode for encoding a current block of pixels according to an Intra coding mode, the method comprising for the determination of set of most probable modes:

defining at least one candidate for a most probable mode to be the mode information of a neighbor-block if it exists;

wherein a candidate for a most probable mode is the horizontal or vertical mode information if this neighbor-block exists and has been encoded using a screen content coding mode.

In some embodiments the neighbor-block is located left to the current block and wherein the candidate for a most probable mode determined if this neighbor-block exists and has been encoded using a screen content coding mode is the horizontal mode information.

In some embodiments the neighbor-block is located top of the current block and wherein the candidate for a most probable mode determined if this neighbor-block exists and has been encoded using a screen content coding mode is the vertical mode information.

Figure 1:
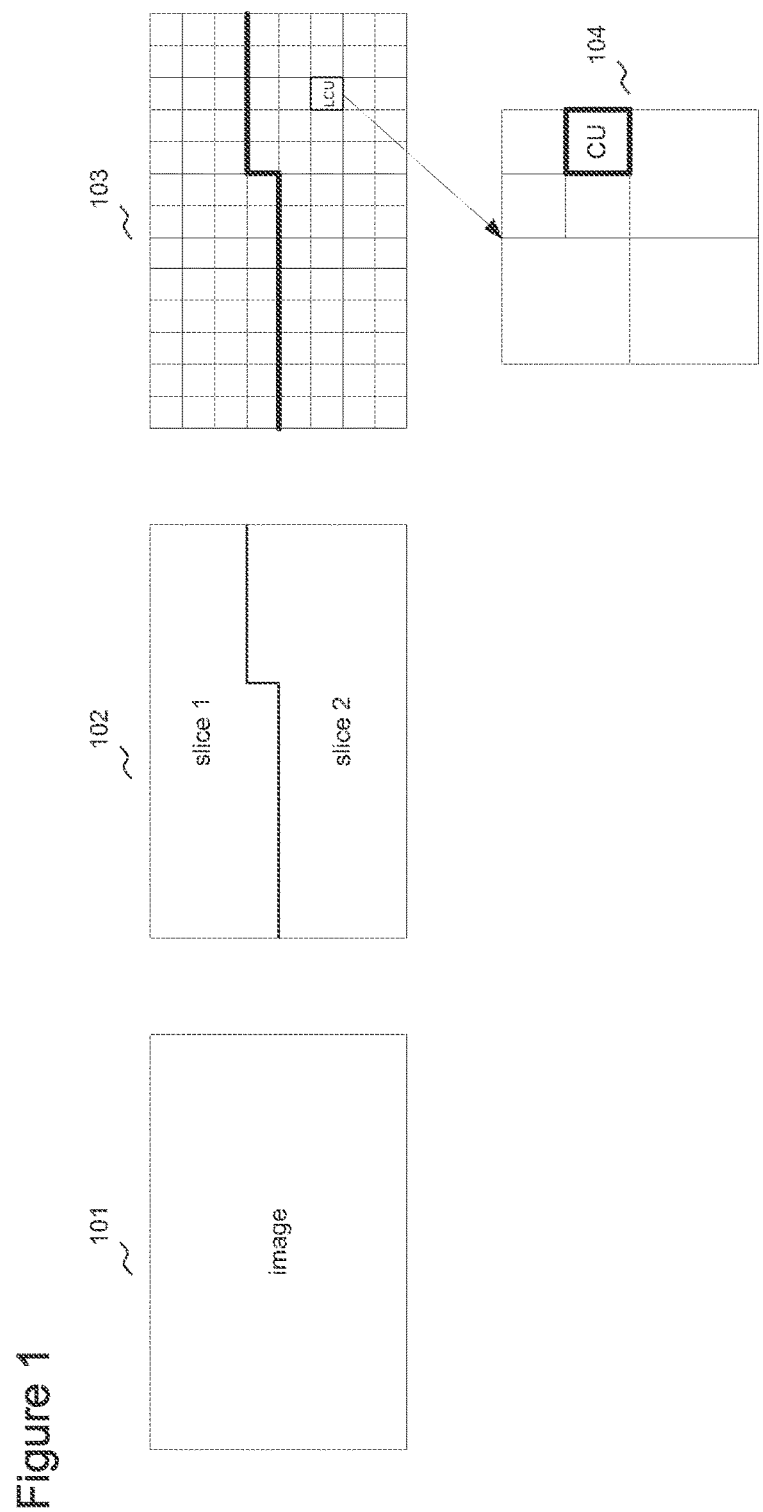
FIG. 1 schematically illustrates an example of a HEVC coding structure
Figure 2:
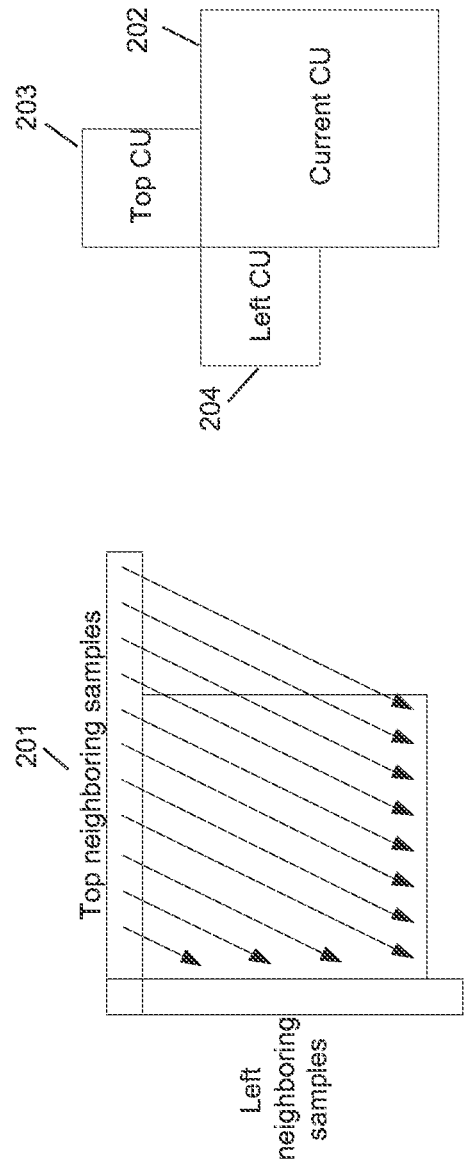
FIGS. 2A and 2B, are schematic diagrams for use in explaining how an intra prediction block is derived in a known HEVC design.
Figure 3:
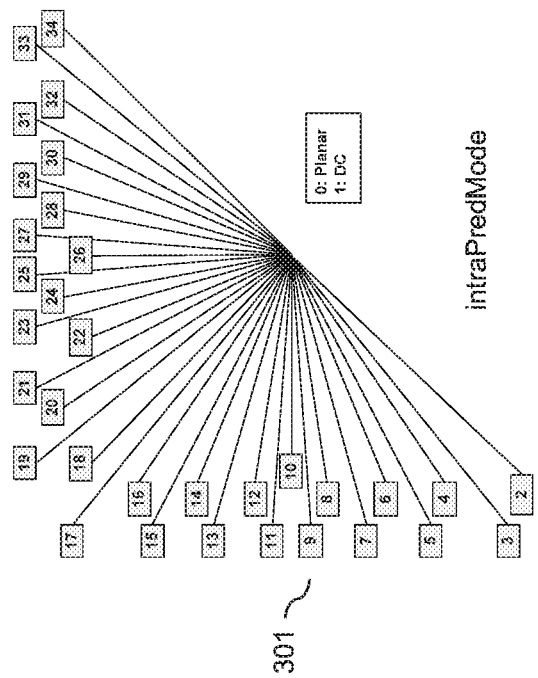
FIG. 3 schematically illustrates intra prediction modes in a known HEVC design.
Figure 4:
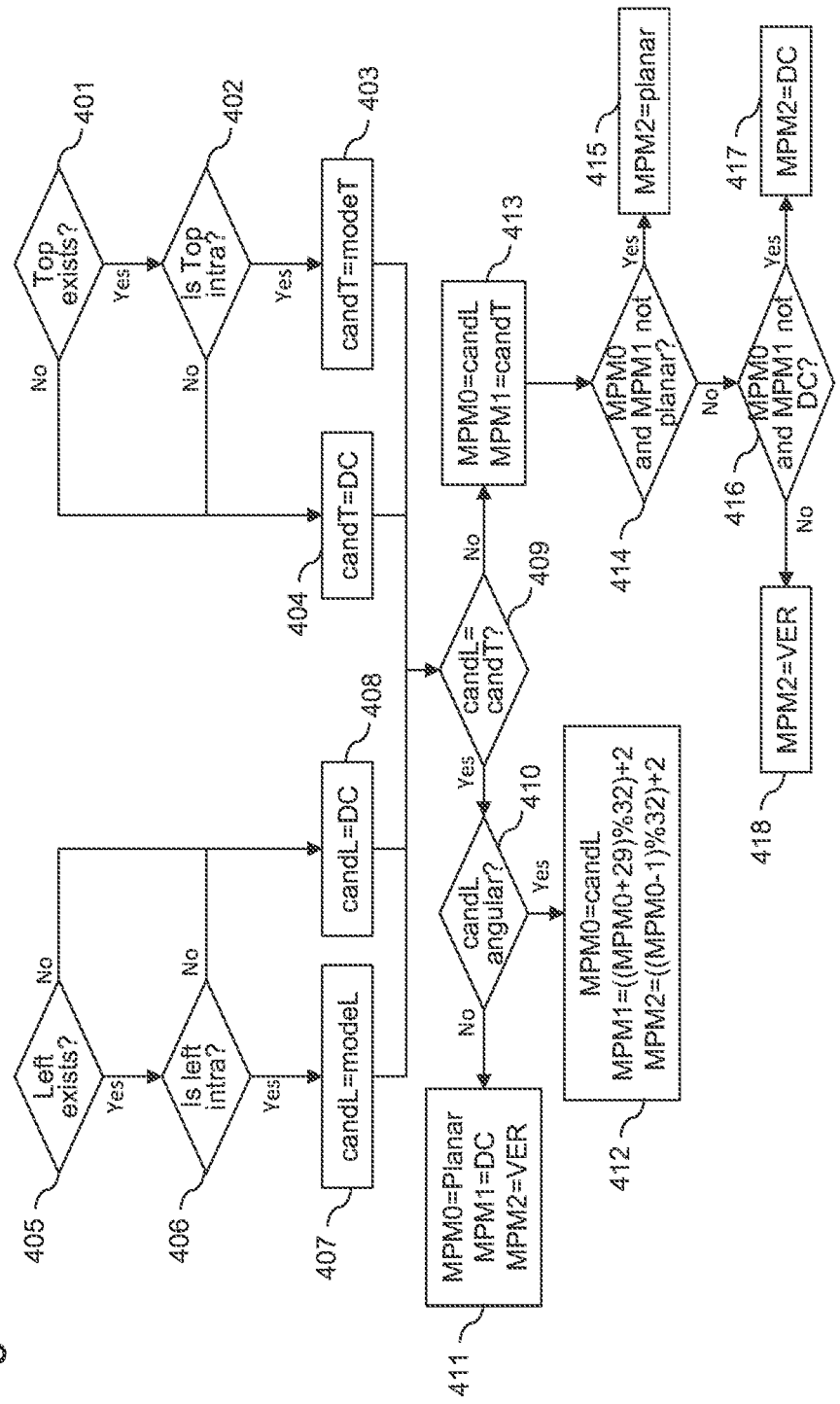
FIG. 4 is a flowchart for use in explaining intra mode coding in a known HEVC design.
Figure 5:
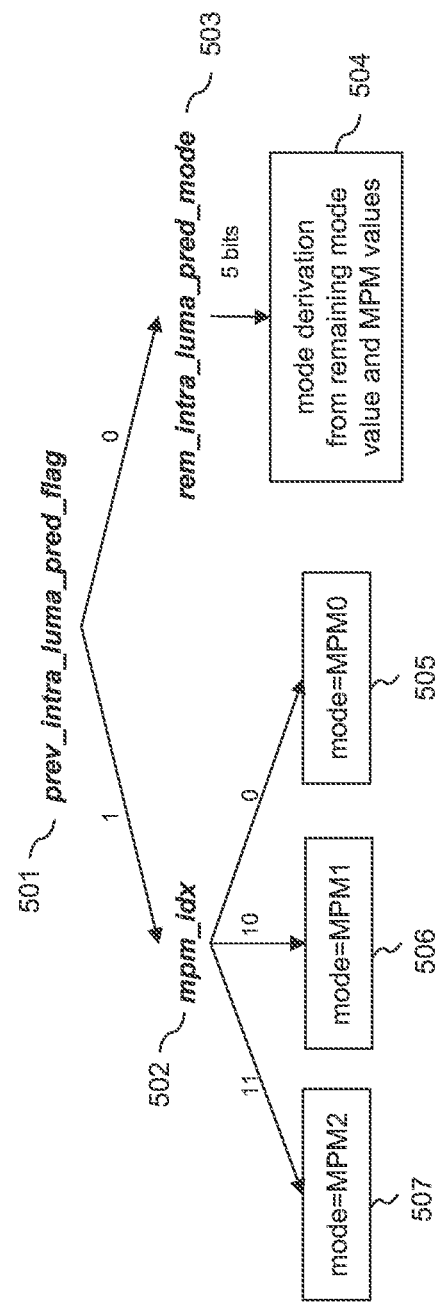
FIG. 5 is a flowchart for use in explaining an intra mode decoding tree in a known HEVC design.
Figure 10:
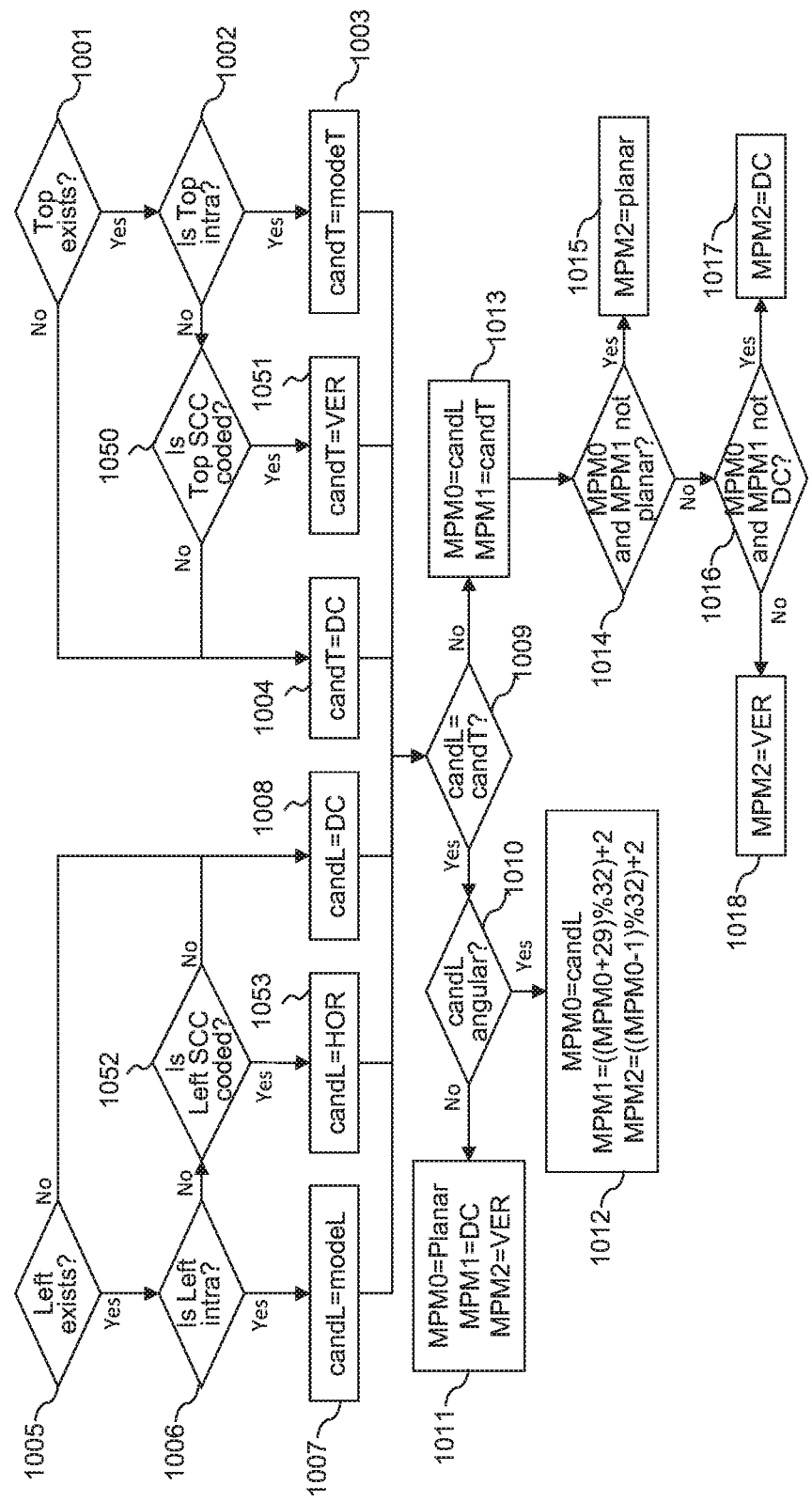
FIG. 10 is a flow chart illustrating steps of a method according to a first embodiment of the invention for encoding mode information representing a prediction mode.

FIG. 10 illustrates an embodiment of the invention and is adapted from FIG. 4. Consequently steps 401 to 418 are identical to respectively steps 1001 to 1018, while the inventive steps of the preferred embodiment are 1050 to 1053. The order of the steps is given as an example. It is not limitative. In further embodiments, prior to any step in this figure, a variable isSCC is set to false. However, when respectively Top CU 203 and Left CU 204 (of FIG. 2) are not Intra, then respectively steps 1050 and 1052 check whether their respective CU is coded in a Screen Content mode (which could mean in an embodiment that the CU is not coded in any other coding modes). In the preferred embodiment, this implies checking whether the respective CU is coded with the Intra Block Copy or the Palette modes, i.e. if the CU is neither "Inter" nor "Intra" coded. If at least one neighbor block of pixels of the current block of pixels has been encoded using a screen content coding mode (i.e. in the preferred embodiment is neither "Inter" nor "Intra" coded), then the variable isSCC is set to true. In additional embodiments, this could also involve checking whether another tool related to Screen Content is used. In the SCC extension, such tools as Adaptive Color Transform, Residual DPCM, and Adaptive Motion Resolution may be concerned. The man skilled in the art may also consider typical coding methods in a context differing or not yet part of the SCC extension, such as dictionary-based (e.g. Lempel-Ziv and derivatives), string-based, line-based, etc. In such case, and in the appropriate embodiments, the variable isSCC may be set to true.

As a variant, the order of the steps may be step 1005, then 1052 and finally 1006 for the left neighbor.

If the check on respectively steps 1050 and 1052, then respectively candT and candL are set to respectively the VER and HOR Intra prediction modes in respectively steps 1051 and 1053, otherwise they are respectively set on steps 1004 and 1008 to DC. In another embodiment, they are set to, on respectively steps 1004 and 1008, instead of DC, to respectively HOR and VER. Indeed, HOR and VER are very likely Intra prediction modes. This underlines the possibility of other embodiments where, in addition to 1004 and 1008, any of 1011 to 1014 are instead modified to account for the fact that at least one of the neighbor CUs 203 and 204 were coded in a mode adapted to Screen Content, Intra Block Copy and Palette modes inclusive or not. In some embodiment, this adaptation consists in replacing the planar information mode by the horizontal information mode in the derivation of further candidate information mode. In some embodiment, it consists in replacing the DC information mode by the vertical information mode in the derivation of further candidate information mode. For instance, on steps 1014 and 1015, if isSCC is true, then HOR is used instead of planar. Another example is for steps 1016 to 1019, where if isSCC is true, instead, DC, DC and VER are respectively changed to VER, VER and DC. The man skilled in the art will carefully balance the benefit of each such modification compared to the coding efficiency gain.

Embodiments of the invention thus provide ways of encoding and decoding a prediction mode in an HEVC SCC encoder, with increased coding efficiency.

Although the present invention has been described hereinabove with reference to specific embodiments, the present invention is not limited to the specific embodiments, and modifications will be apparent to a skilled person in the art which lie within the scope of the present invention. In particular the different features from different embodiments may be interchanged or combined, where appropriate.

Many further modifications and variations will suggest themselves to those versed in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method, by a computing device, for encoding an image, the method comprising:
   receiving the image within an original sequence of digital images received as an input by the computing device;
   encoding the image into encoded data, the encoding comprising the encoding of mode information representing a prediction mode for encoding a current block of pixels according to an Intra coding mode;
   encapsulating the encoded data within a bitstream output from the computing device;
   wherein encoding the current block of pixels comprises for the determination of set of most probable prediction modes:
   defining at least one candidate for a most probable prediction mode to be the mode information of a neighbor-block if it exists;
   and wherein
   a candidate for a most probable prediction mode is horizontal or vertical mode information if this neighbor-block exists and has been encoded using a predetermined coding mode,
   wherein the predetermined coding mode is neither inter coding mode nor intra coding mode.

2. The method of claim 1, wherein the predetermined coding mode is a screen content coding mode.

3. The method of claim 2, wherein the neighbor-block is located left to the current block and wherein the candidate for a most probable prediction mode determined if this neighbor-block exists and has been encoded using a screen content coding mode is the horizontal mode information.

4. The method of claim 2, wherein the neighbor-block is located top of the current block and wherein the candidate for a most probable prediction mode determined if this neighbor-block exists and has been encoded using a screen content coding mode is the vertical mode information.

5. The method of claim 2, the method comprising for the determination of set of most probable prediction modes:
   determining the existence of a left-block being a block of pixels already encoded located at the left of the current block; and
   defining a first candidate for a most probable prediction mode to be the mode information of this left-block if it exists and has been encoded using an Intra coding mode; and
   determining the existence of a top-block of pixels already encoded located at the top of the current block; and
   defining a second candidate for a most probable prediction mode to be the mode information of this top-block if it exists and has been encoded using an Intra coding mode; and
   wherein the method further comprises:
   defining a first candidate for a most probable prediction mode to be the horizontal mode information if this left-block exists and has been encoded using a screen content coding mode; and
   defining a second candidate for a most probable prediction mode to be the vertical mode information if this top-block exists and has been encoded using a screen content coding mode.

6. The method according to claim 2, wherein the screen content coding modes referred as screen content Intra coding modes are the Intra Block Copy coding mode and the Palette mode as defined in HEVC standard.

7. The method according to claim 3, further comprising:
   defining a first candidate for a most probable prediction mode to be the horizontal mode information if this left-block does not exist; and
   defining a second candidate for a most probable prediction mode to be the vertical mode information if this top-block does not exist.

8. The method according to claim 2, wherein the planar information mode is replaced by the horizontal information mode in the derivation of further candidates information mode if a neighbor-block exists and has been encoded using a screen content coding mode.

9. The method according to claim 2, wherein the DC information mode is replaced by the vertical information mode in the derivation of further candidates information mode if a neighbor-block exists and has been encoded using a screen content coding mode.

10. A device for encoding an image, the device comprising a processor being configured for:
   receiving the image within an original sequence of digital images received as an input by the computing device;
   encoding the image into encoded data, the encoding comprising the encoding of mode information representing a prediction mode for encoding a current block of pixels according to an Intra coding mode;
   encapsulating the encoded data within a bitstream output from the computing device;
   wherein encoding the image comprises for the determination of set of most probable prediction modes;
   defining at least one candidate for a most probable prediction mode to be the mode information of a neighbour-block if it exists;
   and wherein a candidate for a most probable prediction mode is horizontal or vertical mode information if this neighbour-block exists and has been encoded using a predetermined coding mode,
   wherein the predetermined coding mode is neither inter coding mode nor intra coding mode.

11. A non-transitory computer-readable storage medium storing instructions of a computer program for implementing a method according to claim 1.

* * * * *